United States Patent
Zhang et al.

(10) Patent No.: US 10,805,814 B2
(45) Date of Patent: Oct. 13, 2020

(54) SIGNAL MEASUREMENT METHOD AND APPARATUS

(71) Applicant: Huawei Technologies Co., Ltd., Shenzhen (CN)

(72) Inventors: Xingwei Zhang, Shenzhen (CN); Chao Li, Shenzhen (CN); Qiang Li, Shenzhen (CN); Yuan Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 15/048,386

(22) Filed: Feb. 19, 2016

(65) Prior Publication Data
US 2016/0174091 A1 Jun. 16, 2016

Related U.S. Application Data

(63) Continuation of application No. PCT/CN2013/082051, filed on Aug. 22, 2013.

(51) Int. Cl.
H04W 24/08 (2009.01)
H04W 36/00 (2009.01)
(Continued)

(52) U.S. Cl.
CPC ........... *H04W 24/08* (2013.01); *H04W 24/10* (2013.01); *H04W 36/0094* (2013.01); *H04W 72/085* (2013.01); *H04W 36/0085* (2018.08)

(58) Field of Classification Search
CPC .... H04W 24/08; H04W 24/10; H04W 72/085
See application file for complete search history.

(56) References Cited

U.S. PATENT DOCUMENTS

2013/0178216 A1 7/2013 Chang et al.
2013/0260741 A1* 10/2013 Yamada ............... H04W 24/00
455/422.1
(Continued)

FOREIGN PATENT DOCUMENTS

CN 101808358 A 8/2010
CN 102014422 A 4/2011
(Continued)

OTHER PUBLICATIONS

"3rd Generation Partnership Project; Technical Specificaton Group Radio Access Network; Evolved Universal Terrestrial Radio Access (E-UTRA); Physical Channels and Modulation (Release 11)," 3GPP TS 36.211, V11.3.0, Technical Specification, Jun. 2013, 108 pages.
(Continued)

*Primary Examiner* — Kodzovi Acolatse
*Assistant Examiner* — Farhad Ali
(74) *Attorney, Agent, or Firm* — Slater Matsil, LLP

(57) ABSTRACT

The present invention provides a signal measurement method and apparatus, where the method includes: receiving, by user equipment UE, a measurement configuration message sent by a base station, where the measurement configuration message is used to indicate a reference signal type; performing, by the UE according to the reference signal type indicated by the measurement configuration message, signal quality measurement on a cell to obtain a measurement result; and sending, by the UE, the measurement result to the base station. The method provided in embodiments of the present invention is used to resolve a technical problem in the prior art that normal communication of UE cannot be ensured because RSRP and/or RSRQ of neighboring cells cannot be measured based on an existing reference signal when the neighboring cells use different carrier types.

16 Claims, 3 Drawing Sheets

(51) Int. Cl.
*H04W 24/10* (2009.01)
*H04W 72/08* (2009.01)

(56) References Cited

U.S. PATENT DOCUMENTS

| | | | |
|---|---|---|---|
| 2014/0105166 A1 | 4/2014 | Yamada et al. | |
| 2014/0112184 A1 | 4/2014 | Chai | |
| 2014/0140293 A1* | 5/2014 | Sharma | H04L 5/001 370/329 |
| 2014/0286176 A1* | 9/2014 | Ro | H04W 24/04 370/242 |

FOREIGN PATENT DOCUMENTS

| | | |
|---|---|---|
| CN | 102026232 A | 4/2011 |
| CN | 102293032 A | 12/2011 |
| CN | 102315871 A | 1/2012 |
| CN | 102448088 A | 5/2012 |
| CN | 102882612 A | 1/2013 |
| CN | 103096368 A | 5/2013 |
| CN | 103119868 A | 5/2013 |
| WO | 2013005855 A1 | 1/2013 |
| WO | 2013051864 A1 | 4/2013 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331, V11.4.0, Technical Specification, Jun. 2013, 346 pages.

Huawei et al., "General Framework and Principles for Configuration of CSI-RS Based Received Signal Quality Measurement," 3GPP TSG-RAN WG2 Meeting #78, R2-122135, May 21-25, 2012, Prague, Czech Republic, 6 pages.

* cited by examiner

SIGNAL MEASUREMENT METHOD AND APPARATUS

This application is a continuation of International Application No. PCT/CN2013/082051, filed on Aug. 22, 2013, which is hereby incorporated by reference in its entirety.

TECHNICAL FIELD

The present invention relates to the field of communications technologies, and in particular, to a signal measurement method and apparatus.

BACKGROUND

As communications technologies continuously develop, hotspot improvement in the Long Term Evolution-Advanced (LTE-A) Rel-12 has become a hot subject. Hotspot areas include indoor and outdoor scenarios. Coverage areas of multiple low-power micro base stations form multiple small cells. For a scenario in which micro base stations are densely deployed, the micro base stations cause interference to each other, and fast carrier selection becomes an optional solution to the interference. For example, a micro base station 1 is a base station that serves a current serving cell of user equipment (UE for short), the micro base station 1 works on a carrier 1, and a micro base station 2 may also work on the carrier 1. When the micro base station 2 working on the carrier 1 causes relatively high interference to the micro base station 1 that serves the serving cell of the UE, or the micro base station 1 causes relatively high interference to the micro base station 2 on the carrier 1, because the micro base station 2 can work on both the carrier 1 and a carrier 2, after the micro base station 1 negotiates with the micro base station 2, the micro base station 2 enables the carrier 2, disables the carrier 1, and works on the carrier 2. Therefore, interference between the micro base station 1 and the micro base station 2 is avoided.

In the prior art, to ensure communication of the UE, the micro base station 1 configures, for the UE, a list of neighboring cells of the UE, and the UE measures reference signal received power (RSRP for short) or reference signal received quality (RSRQ for short) of multiple neighboring cells in the list of neighboring cells according to a reference signal (RS for short), and selects a neighboring cell that has better RSRP and/or RSRQ as a target cell; the micro base station 1 hands over the UE from the current serving cell to the target cell.

However, in the prior art, UE measures RSRP and/or RSRQ of a neighboring cell based on a common reference signal (CRS for short) or based on another RS by default. When neighboring cells use different carrier types, RSRP and/or RSRQ of the neighboring cells cannot be measured based on an existing reference signal, and therefore, normal communication of the UE cannot be ensured.

SUMMARY

Embodiments of the present invention provide a signal measurement method and apparatus, so as to resolve a technical problem in the prior art that normal communication of UE cannot be ensured because RSRP and/or RSRQ of neighboring cells cannot be measured based on an existing reference signal when the neighboring cells use different carrier types.

A first aspect of the embodiments of the present invention provides a signal measurement method, including receiving, by UE, a measurement configuration message sent by a base station, where the measurement configuration message is used to indicate a reference signal type; performing, by the UE according to the reference signal type indicated by the measurement configuration message, signal quality measurement on a cell to obtain a measurement result; and sending, by the UE, the measurement result to the base station.

With reference to the first aspect, in a first possible implementation manner of the first aspect, the measurement configuration message carries a measurement identity ID, where the measurement ID is used to indicate that a cell on which signal quality measurement is performed is a current serving cell or a neighboring cell of a current serving cell.

With reference to the first possible implementation manner of the first aspect, in a second possible implementation manner of the first aspect, the measurement configuration message carries a reference signal type identity, where the reference signal type identity is used to indicate the reference signal type; or measurement IDs within different value ranges are used to indicate different reference signal types.

With reference to any one of the first aspect to the second possible implementation manner of the first aspect, in a third possible implementation manner of the first aspect, the reference signal type includes at least one of N reference signals, where N is a positive integer greater than 1.

With reference to the third possible implementation manner of the first aspect, in a fourth possible implementation manner of the first aspect, if the reference signal type is a first reference signal of the N reference signals, the performing, by the UE according to the reference signal type indicated by the measurement configuration message, signal quality measurement on a cell to obtain a measurement result specifically includes: measuring, by the UE on the first reference signal of the cell, at least one of RSRP of the cell and RSRQ of the cell according to the first reference signal indicated by the measurement configuration message. Alternatively, if the reference signal type is a second reference signal of the N reference signals, the performing, by the UE according to the reference signal type indicated by the measurement configuration message, signal quality measurement on a cell to obtain a measurement result specifically includes: measuring, by the UE on the second reference signal of the cell, at least one of RSRP of the second reference signal and RSRQ of the second reference signal according to the second reference signal indicated by the measurement configuration message. Alternatively, if the reference signal types are a first reference signal and a second reference signal, the performing, by the UE according to the reference signal type indicated by the measurement configuration message, signal quality measurement on a cell to obtain a measurement result specifically includes: measuring, by the UE on the first reference signal of the cell, at least one of RSRP of the cell and RSRQ of the cell and measuring, by the UE on the second reference signal of the cell, at least one of RSRP of the cell and RSRQ of the cell, according to the first reference signal and the second reference signal indicated by the measurement configuration message.

With reference to the fourth possible implementation manner of the first aspect, in a fifth possible implementation manner of the first aspect, the first reference signal is a common reference signal CRS, and the second reference signal is a channel state information-reference signal CSI-RS.

A second aspect of the embodiments of the present invention provides a signal measurement method, including sending, by a base station, a measurement configuration message to UE, where the measurement configuration message is used to indicate a reference signal type, so that the UE performs, according to the reference signal type indicated by the measurement configuration message, signal quality measurement on a cell to obtain a measurement result. The measurement result reported by the UE is received by the base station.

With reference to the second aspect, in a first possible implementation manner of the second aspect, before the sending, by a base station, a measurement configuration message to user equipment UE, the method further includes configuring, by the base station, the measurement configuration message according to a carrier type of a neighboring cell of a current serving cell.

With reference to the first possible implementation manner of the second aspect, in a second possible implementation manner of the second aspect, the measurement configuration message carries a measurement identity ID, where the measurement ID is used to indicate that a cell on which signal quality measurement is performed is the current serving cell or the neighboring cell of the current serving cell.

With reference to the second possible implementation manner of the second aspect, in a third possible implementation manner of the second aspect, the measurement configuration message carries a reference signal type identity, where the reference signal type identity is used to indicate the reference signal type; or measurement IDs within different value ranges are used to indicate different reference signal types.

With reference to any one of the second aspect to the third possible implementation manner of the second aspect, in a fourth possible implementation manner of the second aspect, the reference signal type includes at least one of N reference signals, where N is a positive integer greater than 1.

A third aspect of the embodiments of the present invention provides a signal measurement apparatus, including a receiver, configured to receive a measurement configuration message sent by a base station, where the measurement configuration message is used to indicate a reference signal type. A processor is configured to perform, according to the reference signal type indicated by the measurement configuration message, signal quality measurement on a cell to obtain a measurement result. A transmitter is configured to send the measurement result to the base station.

With reference to the third aspect, in a first possible implementation manner of the third aspect, the measurement configuration message carries a measurement identity ID, where the measurement ID is used to indicate that a cell on which signal quality measurement is performed is a current serving cell or a neighboring cell of a current serving cell.

With reference to the first possible implementation manner of the third aspect, in a second possible implementation manner of the third aspect, the measurement configuration message carries a reference signal type identity, where the reference signal type identity is used to indicate the reference signal type; or measurement IDs within different value ranges are used to indicate different reference signal types.

With reference to any one of the third aspect to the second possible implementation manner of the third aspect, in a third possible implementation manner of the third aspect, the reference signal type includes at least one of N reference signals, where N is a positive integer greater than 1.

With reference to the third possible implementation manner of the third aspect, in a fourth possible implementation manner of the third aspect, if the reference signal type is a first reference signal of the N reference signals, the processor is specifically configured to measure, on the first reference signal of the cell, at least one of RSRP of the cell and RSRQ of the cell according to the first reference signal indicated by the measurement configuration message. Alternatively, if the reference signal type is a second reference signal of the N reference signals, the processor is specifically configured to measure, on the second reference signal of the cell, at least one of RSRP of the second reference signal and RSRQ of the second reference signal according to the second reference signal indicated by the measurement configuration message. Alternatively, if the reference signal types are a first reference signal and a second reference signal, the processor is specifically configured to measure, on the first reference signal of the cell, at least one of RSRP of the cell and RSRQ of the cell, and measure, on the second reference signal of the cell, at least one of RSRP of the cell and RSRQ of the cell, according to the first reference signal and the second reference signal indicated by the measurement configuration message.

With reference to the fourth possible implementation manner of the third aspect, in a fifth possible implementation manner of the third aspect, the first reference signal is a common reference signal CRS, and the second reference signal is a channel state information-reference signal CSI-RS.

A fourth aspect of the embodiments of the present invention provides a signal measurement apparatus, including a transmitter, configured to send a measurement configuration message to UE, where the measurement configuration message is used to indicate a reference signal type, so that the UE performs, according to the reference signal type indicated by the measurement configuration message, signal quality measurement on a cell to obtain a measurement result. A receiver is configured to receive the measurement result reported by the UE.

With reference to the fourth aspect, in a first possible implementation manner of the fourth aspect, the apparatus further includes a processor, configured to: before the transmitter sends the measurement configuration message to the user equipment UE, configure the measurement configuration message according to a carrier type of a neighboring cell of a current serving cell.

With reference to the first possible implementation manner of the fourth aspect, in a second possible implementation manner of the fourth aspect, the measurement configuration message carries a measurement identity ID, where the measurement ID is used to indicate that a cell on which signal quality measurement is performed is the current serving cell or the neighboring cell of the current serving cell.

With reference to the second possible implementation manner of the fourth aspect, in a third possible implementation manner of the fourth aspect, the measurement configuration message carries a reference signal type identity, where the reference signal type identity is used to indicate the reference signal type; or measurement IDs within different value ranges are used to indicate different reference signal types.

With reference to any one of the fourth aspect to the third possible implementation manner of the fourth aspect, in a fourth possible implementation manner of the fourth aspect, the reference signal type includes at least one of N reference signals, where N is a positive integer greater than 1.

According to the signal measurement method and apparatus provided in the embodiments of the present invention, a base station sends, to UE, a measurement configuration message used to indicate a reference signal type, and the UE performs, according to the reference signal type indicated by the measurement configuration message, signal quality measurement on a cell to obtain a measurement result, and sends the measurement result to the base station. In this way when neighboring cells use different carrier types, corresponding reference signals are used to measure at least one of RSRP and RSRQ of the neighboring cells, so as to further ensure normal communication of the UE.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

Figure 1:
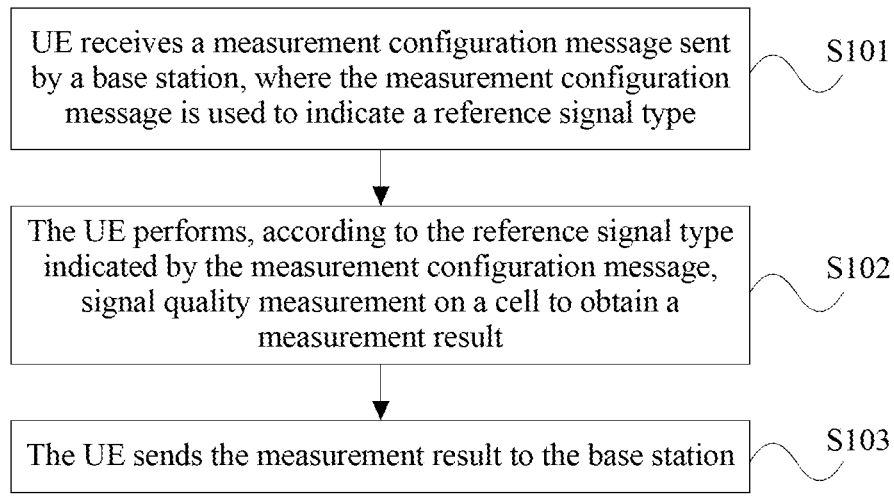
FIG. 1 is a schematic flowchart of Embodiment 1 of a signal measurement method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an Orthogonal Frequency Division Multiple Access (OFDMA) system, a single-carrier FDMA (SC-FDMA) system, a general packet radio service (GPRS) system, a Long Term Evolution (LTE) system, and other communications systems.

User equipment involved in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

A base station (for example, an access point) involved in this application may refer to a device in communication with a wireless terminal via one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be an AP in a wireless local area network WLAN, may be a base station (BTS) in the GSM or the CDMA, may be a base station (NodeB) in the WCDMA, or may be an evolved NodeB (NodeB, eNB, or e-NodeB) in the LTE, which is not limited in this application.

Using an LTE-A system as an example, after UE performs signal quality measurement on a current serving cell and a neighboring cell, a base station needs to obtain measurement results, so as to perform scheduling or mobility management on the UE. For ease of channel measurement performed on a wireless link, the base station inserts, into to-be-sent downlink signals, some reference signals that do not carry data, where these reference signals are known to both a sending party and a receiving party. For a downlink, the UE has already known time-frequency locations and corresponding sequences of the reference signals; therefore, during downlink receiving, the UE may compare received signals with the known sequences of the reference signals, so as to determine what channel changes the known sequences of the reference signals have undergone before the signals currently received by the UE are generated; and complete quality measurement on a downlink channel.

FIG. 1 is a schematic flowchart of Embodiment 1 of a signal measurement method according to the present invention. As shown in FIG. 1, the method includes:

S101. UE receives a measurement configuration message sent by a base station, where the measurement configuration message is used to indicate a reference signal type.

A current serving cell of the UE and a neighboring cell of the UE have their corresponding base stations, and a base station of the current serving cell of the UE sends a configuration of a list of some of neighboring cells to the UE, so that the UE measures signal quality of these neighboring cells. Specifically, the UE receives a measurement configuration message sent by the base station, where the measurement configuration message is used to indicate a reference signal type. For example, the indicated reference signal type may be a CRS, and the UE performs signal quality measurement on a cell based on the CRS; or the indicated reference signal type may be a channel state information-reference signal (CSI-RS for short), and the UE performs signal quality measurement on a cell based on the CSI-RS; or the indicated reference signal type may be another reference signal, such as a demodulation reference signal (DM-RS for short), or a positioning reference signal (PRS for short), which is not limited in the present invention. In addition, before sending the measurement configuration message to the UE, the base station configures different reference signal types in the measurement configuration message according to different carriers used by the neighboring cells, so as to instruct the UE to use the different reference signal types to perform signal quality measurement on a cell. It may be understood that this embodiment of the present invention constitutes no limitation on the reference signal type indicated by the measurement configuration message. The measurement configuration message may carry a parameter of the reference signal type in an explicit manner, or indicate the reference signal type in an implicit manner.

S102. The UE performs, according to the reference signal type indicated by the measurement configuration message, signal quality measurement on a cell to obtain a measurement result.

S103. The UE sends the measurement result to the base station.

It should be noted that, in addition to being used to indicate the reference signal type, generally the measurement configuration message may carry parameters, such as a measurement object, a reporting configuration, a measurement quantity, and a measurement gap. The measurement object may be a cell on which the UE needs to perform measurement. For example, the UE may perform measurement only on the current serving cell of the UE, or may perform measurement only on one or more neighboring cells, or may perform measurement on the current serving cell and one or more neighboring cells. The reporting configuration includes a reporting format and a criterion that triggers the UE to report a measurement result. For the measurement quantity, each radio access technology (RAT for short), such as the GSM, Universal Mobile Telecommunications System (UMTS for short), or the LTE, is corresponding to a particular quantity configuration, where the quantity configuration defines measurement quantities and associated filtering used for event triggering. The measurement gap is a time interval at which the UE performs measurement, that is, a measurement period.

The UE performs signal quality measurement on a corresponding cell according to the reference signal type indicated by the measurement configuration message. That is, when neighboring cells use different carrier types, the UE uses corresponding reference signal types to measure RSRP and/or RSRQ of the neighboring cells, so as to obtain measurement results. For example, when a neighboring cell uses a backward-compatible carrier type (BCT for short), the UE may perform measurement based on a CRS because a CRS exists in each subframe, but a CSI-RS exists only in some subframes and occurs periodically. When a neighboring cell uses an NCT (new carrier type), only port 0 of a CRS on the NCT carrier is retained, and a sending period is extended to 5 ms. Therefore, not each subframe has a CRS, and it is determined that the retained CRS port is not used for demodulation. In this case, RSRP/RSRQ at an RRC layer on the NCT may be measured based on a CRS or based on another RS, such as a CSI-RS. Therefore, regardless of a carrier type used by the serving cell or a neighboring cell of the UE, at least one of RSRP and RSRQ of the serving cell or the neighboring cell may be measured according to a reference signal type indicated by a reference signal type identity.

It should be noted that the neighboring cell herein may further be the current serving cell of the UE, which is determined by a measurement object. When the foregoing measurement result meets a triggering condition for measurement reporting, the UE reports the measurement result to the base station.

According to the method provided in this embodiment of the present invention, a base station sends, to UE, a measurement configuration message used to indicate a reference signal type, and the UE performs, according to the reference signal type indicated by the measurement configuration message, signal quality measurement on a cell to obtain a measurement result, and sends the measurement result to the base station. In this way when neighboring cells use different carrier types, corresponding reference signals are used to measure at least one of RSRP and RSRQ of the neighboring cells, so as to further ensure normal communication of the UE.

Figure 2:
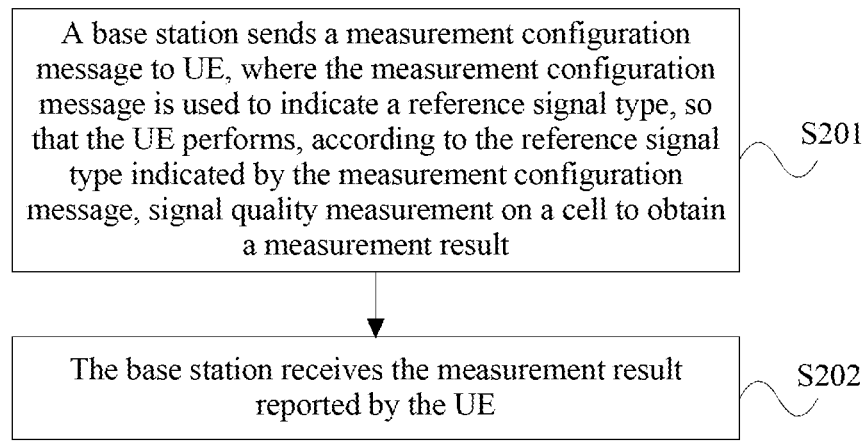
FIG. 2 is a schematic flowchart of Embodiment 2 of a signal measurement method according to the present invention.

FIG. 2 is a schematic flowchart of Embodiment 2 of a signal measurement method according to the present invention, where the method includes:

S201. A base station sends a measurement configuration message to UE, where the measurement configuration message is used to indicate a reference signal type, so that the UE performs, according to the reference signal type indicated by the measurement configuration message, signal quality measurement on a cell to obtain a measurement result.

S202. The base station receives the measurement result reported by the UE.

Specifically, a current serving cell of the UE and a neighboring cell of the UE have their corresponding base stations, and a base station of the current serving cell of the UE sends a configuration of a list of some of neighboring cells to the UE, so that the UE measures signal quality of these neighboring cells. Specifically, the base station sends a measurement configuration message to the UE, where the measurement configuration message is used to indicate a reference signal type, so that the UE measures, according to the reference signal type indicated by the measurement configuration message, at least one of RSRP and RSRQ of a cell to obtain a measurement result. For example, the indicated reference signal type may be a CRS, and the UE performs signal quality measurement on a cell based on the CRS; or the indicated reference signal type may be a CSI-RS, and the UE performs signal quality measurement on a cell based on the CSI-RS. It may be understood that this embodiment of the present invention constitutes no limitation on the reference signal type indicated by the measurement configuration message. The measurement configuration message may carry a parameter of the reference signal type in an explicit manner, or indicate the reference signal type in an implicit manner.

It should be noted that, in addition to being used to indicate the reference signal type, generally the measurement configuration message may carry parameters, such as a measurement object, a reporting configuration, a measurement quantity, and a measurement gap. The measurement object may be a cell on which the UE needs to perform measurement. For example, the UE may perform measurement only on the current serving cell of the UE, or may perform measurement only on one or more neighboring cells, or may perform measurement on the current serving cell and one or more neighboring cells. The reporting configuration includes a reporting format and a criterion that triggers the UE to report a measurement result. For the measurement quantity, each radio access technology (RAT for short), such as the GSM, the Universal Mobile Telecommunications System (UMTS for short), or the LTE, is corresponding to a particular quantity configuration, where the quantity configuration defines measurement quantities and associated filtering used for event triggering. The measurement gap is a time interval at which the UE performs measurement, that is, a measurement period.

When the foregoing measurement result meets a report criterion preset in the reporting configuration in the measurement configuration message, the measurement result is reported to the base station, so that the base station learns quality of a downlink channel and determines a next operation.

According to the method provided in this embodiment, a base station sends, to UE, a measurement configuration message used to indicate a reference signal type, so that the UE measures signal quality of a cell according to the indicated reference signal type to obtain a measurement result, and reports the measurement result to the base station. In this way when neighboring cells use different carrier types, corresponding reference signals are used to measure at least one of RSRP and RSRQ of the neighboring cells, so as to further ensure normal communication of the UE.

Based on the embodiment shown in FIG. 2, further, before S201, the method further includes: configuring, by the base station, the measurement configuration message according to a carrier type of a neighboring cell of the current serving cell.

Specifically, when the serving cell or the neighboring cell of the UE uses a BCT, the base station configures the reference signal type in the measurement configuration message as a first reference signal; when the serving cell or the neighboring cell of the UE uses an NCT, the base station configures the reference signal types in the measurement configuration message as a first reference signal and a second reference signal, or a second reference signal.

Further, based on the foregoing embodiment, optionally, the measurement configuration message carries a measurement identity (Identification, ID for short), where the measurement ID is used to indicate that a cell on which signal quality measurement is performed is the current serving cell or the neighboring cell of the current serving cell.

Still further, based on the foregoing embodiment, the measurement configuration message may carry a reference signal type identity, where the reference signal type identity is used to indicate the reference signal type; or measurement IDs within different value ranges are used to indicate different reference signal types.

Specifically, the measurement configuration message carries the reference signal type identity, the reference signal type identity is at least 1 bit, indicating a reference signal type based on which the UE performs measurement, and the reference signal type may be at least one of N reference signals, where N is a positive integer greater than 1. Herein, one example is used for description. It is assumed that the reference signal type has 2 bits. When the reference signal type is in a first state (00), it instructs the UE measures, on a first reference signal of a cell corresponding to a measurement ID, RSRP and/or RSRQ of the cell according to a parameter in the measurement configuration message; when the reference signal type is in a second state (01), it instructs the UE measures, on a second reference signal of a cell corresponding to a measurement ID, RSRP and/or RSRQ of the cell according to a parameter in the measurement configuration message; or when the reference signal type is in a third state (11), it instructs the UE measures, on a first reference signal of a cell corresponding to a measurement ID, RSRP and/or RSRQ of the cell and measures, on a second reference signal of the cell, the RSRP and/or the RSRQ of the cell, according to a parameter in the measurement configuration message.

If the measurement configuration message carries the measurement IDs within different value ranges, the measurement IDs are used to indicate different reference signal types. In general, different cell IDs are corresponding to different cells, and one cell ID may be corresponding to different measurement IDs, that is, may be corresponding to different measurement configurations. A base station classifies cell IDs, so that the cell IDs corresponds to measurement IDs. For example, a measurement ID corresponding to a cell ID 100 is 1 or 2, a measurement ID corresponding to a cell ID 306 is 3, and a measurement ID corresponding to a cell ID 500 is 4. It is assumed that a threshold that is of the measurement ID and that is set in the base station is 2. For a cell whose measurement ID is less than the threshold, a first reference signal is used to measure RSRP and/or RSRQ of the cell; for a cell whose measurement ID is equal to the threshold, RSRP and/or RSRQ of the cell are/is measured according to a second reference signal; for a cell whose measurement ID is greater than the threshold, RSRP and/or RSRQ of the cell are/is measured according to the first reference signal and the second reference signal. It should be noted that, setting of the threshold of the measurement ID is determined by the base station, and the threshold may also be a value range, such as a first range 1 to 3 or a second range 4 to 6; reference signal types used by cells corresponding to measurement IDs within different value ranges are different.

Based on the foregoing embodiment, as a feasible implementation manner, the base station may always include, in measurement configuration messages of all cells sent to the UE, a field used to indicate a reference signal type. If a field length of a measurement configuration message is 10 bits in the prior art, and a field length of a measurement configuration message in this embodiment of the present invention is 10 bits+2 bits, then the rear 2 bits are used to indicate a reference signal type. For example, bits 00 indicate that the reference signal type is a CRS, and bits 10 indicate that the reference signal type is a CSI-RS. Optionally, the reference signal type may include at least one of N reference signals, where N is a positive integer greater than 1.

In this implementation scenario, specifically, if the reference signal type is a first reference signal of the N reference signals, the UE may measure, on the first reference signal of a cell, at least one of RSRP and RSRQ of the cell according to the first reference signal indicated by the measurement configuration message; or if the reference signal type is a second reference signal of the N reference signals, the UE may measure, on the second reference signal of a cell, at least one of RSRP and RSRQ of the cell according to the second reference signal indicated by the measurement configuration message; or if the reference signal types are a first reference signal and a second reference signal, the UE may measure, on the first reference signal of a cell, at least one of RSRP and RSRQ of the cell, and measure, on the second reference signal of the cell, at least one of the RSRP and the RSRQ of the cell, according to the first reference signal and the second reference signal indicated by the measurement configuration message.

Optionally, the first reference signal may be a CRS, and the second reference signal may be a CSI-RS; or the first reference signal may be a common reference signal CRS, and the second reference signal may be a DM-RS; or the first reference signal may be a CSI-RS, and the second reference signal may be a CRS. The present invention does not impose a limitation on an implementation manner.

It should be noted that, in general, when a neighboring cell uses a BCT, the UE may perform measurement based on a CRS because a CRS exists in each subframe, but a CSI-RS exists only in some subframes and occurs periodically. When a neighboring cell uses an NCT, only port 0 of a CRS on the NCT is retained, and a sending period is extended to 5 ms. Therefore, not each subframe has a CRS, and it is determined that the retained CRS port is not used for demodulation. In this case, RSRP/RSRQ at an RRC layer on the NCT may be measured based on a CRS or based on another RS, such as a CSI-RS. Therefore, regardless of a carrier type used by the serving cell or a neighboring cell of the UE, at least one of RSRP and RSRQ of the serving cell or the neighboring cell may be measured according to a reference signal type indicated by a reference signal type identity.

When a value of the reference signal type field in the measurement configuration message is used to indicate a reference signal of a first type, the UE may use a parameter in the measurement configuration message to measure, on a first reference signal of a serving cell or a neighboring cell, at least one of RSRP and RSRQ of the cell; when a value of the reference signal type field in the measurement configuration message is used to indicate a reference signal of a second type, the UE may use a parameter in the measurement configuration message to measure, on a second reference signal of a serving cell or a neighboring cell, at least one of RSRP and RSRQ of the cell; or when a value of the reference signal type field in the measurement configuration message is used to indicate a reference signal of a third type, the measurement configuration message instructs the UE to use a parameter in the measurement configuration message to measure, on a first reference signal of a serving cell or a neighboring cell, at least one of RSRP and RSRQ of the cell, and measure, on a second reference signal, at least one of the RSRP and the RSRQ of the cell.

Based on the foregoing embodiment, as another feasible implementation manner, the base station includes, in measurement configuration messages that are of some of neighboring cells and sent to the UE, a field used to indicate a reference signal type, and a measurement configuration message of a rest neighboring cell uses an existing measurement configuration message.

When receiving a measurement configuration message sent by the base station, the UE determines, according to a type of the measurement configuration message, whether the message is an existing measurement configuration message or a new measurement configuration message. For example, the UE may distinguish between different types of measurement configuration messages according to lengths of the measurement configuration messages. When the UE determines that a field length of the received measurement configuration message sent by the base station is equal to that of the existing measurement configuration message, the UE determines that the measurement configuration message is the existing measurement configuration message, and the UE may measure RSRP and/or RSRQ of a cell based on a CRS. When the UE determines that the field length of the received measurement configuration message sent by the base station is not equal to the field length of the existing measurement configuration message, the UE determines that the measurement configuration message includes a field used to indicate a reference signal type, and the UE determines, according to a value of the field used to indicate the reference signal type, which reference signal type is used to measure RSRP and/or RSRQ of a corresponding cell. For a specific process of measuring signal quality of a cell according to a reference signal type, refer to related description in the foregoing embodiment; details are not described herein again.

Based on the foregoing embodiment, as another feasible implementation manner, measurement configuration messages of all cells that are sent by the base station to the UE always carry measurement IDs within different value ranges; different reference signal types are determined according to different value ranges to which the measurement IDs belong, so as to further measure RSRP and/or RSRQ of corresponding cells.

Specifically, the base station may classify serving cells or neighboring cells of the UE according to the measurement IDs, where a part of the measurement IDs (first range) is allocated to a serving cell or a neighboring cell on which measurement is performed based on a CRS, and an associated reporting configuration; another part of the measurement IDs (second range) is allocated to a serving cell or a neighboring cell on which measurement is performed based on a CSI-RS, and an associated reporting configuration; still another part of the measurement IDs (third range) is allocated to a serving cell or a neighboring cell on which measurement is performed based on a CSI-RS and a CRS, and an associated reporting configuration.

When a measurement ID in a measurement configuration message received by the UE belongs to values in the first range, the UE measures, on a first reference signal of a cell corresponding to the measurement ID, at least one of RSRP and RSRQ of the cell according to a parameter in the measurement configuration message; when a measurement ID in a measurement configuration message received by the UE belongs to values in the second range, the UE measures, on a second reference signal of a cell corresponding to the measurement ID, at least one of RSRP and RSRQ of the cell according to a parameter in the measurement configuration message; when a measurement ID in a measurement configuration message received by the UE belongs to values in the third range, the UE measures, on a first reference signal of a cell corresponding to the measurement ID, at least one of RSRP and RSRQ of the cell, and measures, on a second reference signal, at least one of the RSRP and the RSRQ of the cell, according to a parameter in the measurement configuration message.

According to the method provided in this embodiment of the present invention, a base station sends, to UE, a measurement configuration message used to indicate a reference signal type, and the UE performs, according to the reference signal type indicated by the measurement configuration message, signal quality measurement on a cell to obtain a measurement result, and sends the measurement result to the base station. In this way when neighboring cells use different carrier types, corresponding reference signals are used to measure at least one of RSRP and RSRQ of the neighboring cells, so as to further ensure normal communication of the UE.

Persons of ordinary skill in the art may understand that all or some of the steps of the method embodiment may be implemented by a program instructing relevant hardware. The program may be stored in a computer-readable storage medium. When the program runs, the steps of the method embodiment are performed. The foregoing storage medium includes: any medium that can store program code, such as a ROM, a RAM, a magnetic disk, or an optical disc.

Figure 3:
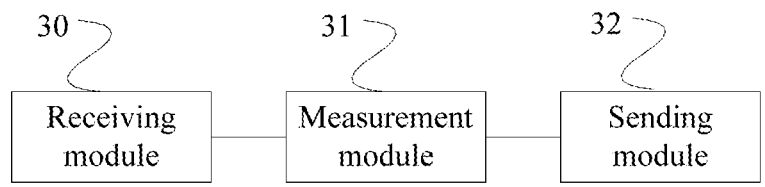
FIG. 3 is a schematic diagram of a structure of Embodiment 1 of a signal measurement apparatus according to the present invention.

FIG. 3 is a schematic diagram of a structure of Embodiment 1 of a signal measurement apparatus according to the present invention. As shown in FIG. 3, the apparatus includes: a receiving module 30, configured to receive a measurement configuration message sent by a base station, where the measurement configuration message is used to indicate a reference signal type; a measurement module 31, configured to perform, according to the reference signal type indicated by the measurement configuration message, signal quality measurement on a cell to obtain a measurement result; and a sending module 32, configured to send the measurement result to the base station.

The measurement apparatus provided in this embodiment may execute the foregoing method embodiment, implementation principles and technical effects thereof are similar, and details are not described herein again.

Further, the measurement configuration message carries a measurement ID, where the measurement ID is used to indicate that a cell on which signal quality measurement is performed is a current serving cell or a neighboring cell of a current serving cell. The measurement configuration message carries a reference signal type identity, where the reference signal type identity is used to indicate the reference signal type; or measurement IDs within different value ranges are used to indicate different reference signal types. The reference signal type includes at least one of N reference signals, where N is a positive integer greater than 1.

Based on the embodiment shown in FIG. 3, further, if the reference signal type is a first reference signal of the N reference signals, the measurement module 31 is specifically configured to measure, on the first reference signal of the cell, at least one of RSRP and RSRQ of the cell according to the first reference signal indicated by the measurement configuration message; or if the reference signal type is a second reference signal of the N reference signals, the measurement module 31 is specifically configured to measure, on the second reference signal of the cell, at least one of RSRP and RSRQ of the cell according to the second reference signal indicated by the measurement configuration message; or if the reference signal types are a first reference signal and a second reference signal, the measurement module 31 is specifically configured to measure, on the first reference signal of the cell, at least one of RSRP and RSRQ of the cell, and measure, on the second reference signal of the cell, at least one of the RSRP and the RSRQ of the cell, according to the first reference signal and the second reference signal indicated by the measurement configuration message.

It should be noted that the first reference signal is a common reference signal CRS, and the second reference signal is a CSI-RS.

The measurement apparatus provided in this embodiment may execute the foregoing method embodiment, implementation principles and technical effects thereof are similar, and details are not described herein again.

Figure 4:
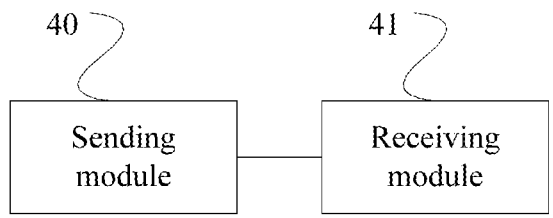
FIG. 4 is a schematic diagram of a structure of Embodiment 2 of a signal measurement apparatus according to the present invention.

FIG. 4 is a schematic diagram of a structure of Embodiment 2 of a signal measurement apparatus according to the present invention. As shown in FIG. 4, the apparatus includes: a sending module 40, configured to send a measurement configuration message to UE, where the measurement configuration message is used to indicate a reference signal type, so that the UE performs, according to the reference signal type indicated by the measurement configuration message, signal quality measurement on a cell to obtain a measurement result; and a receiving module 41, configured to receive the measurement result reported by the UE.

The measurement apparatus provided in this embodiment may execute the foregoing method embodiment, implementation principles and technical effects thereof are similar, and details are not described herein again.

Figure 5:
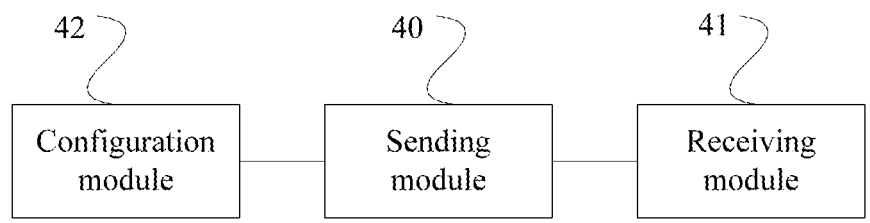
FIG. 5 is a schematic diagram of a structure of Embodiment 3 of a signal measurement apparatus according to the present invention.

FIG. 5 is a schematic diagram of a structure of Embodiment 3 of a signal measurement apparatus according to the present invention. Based on the embodiment shown in FIG. 4, further, the apparatus includes: a configuration module 42, configured to: before the sending module 40 sends the measurement configuration message to the UE, configure the measurement configuration message according to a carrier type of a neighboring cell of a current serving cell.

Further, the measurement configuration message carries a measurement identity ID, where the measurement ID is used to indicate that a cell on which signal quality measurement is performed is the current serving cell or the neighboring cell of the current serving cell. The measurement configuration message carries a reference signal type identity, where the reference signal type identity is used to indicate the reference signal type; or measurement IDs within different value ranges are used to indicate different reference signal types. The reference signal type includes at least one of N reference signals, where N is a positive integer greater than 1.

The measurement apparatus provided in this embodiment may execute the foregoing method embodiment, implementation principles and technical effects thereof are similar, and details are not described herein again.

Figure 6:
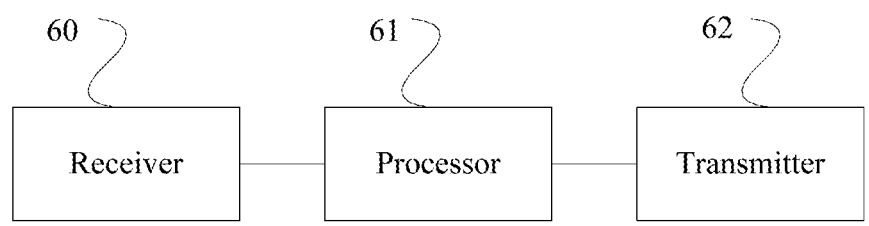
FIG. 6 is a schematic diagram of a structure of Embodiment 4 of a signal measurement apparatus according to the present invention.

FIG. 6 is a schematic diagram of a structure of Embodiment 4 of a signal measurement apparatus according to the present invention. As shown in FIG. 6, the apparatus includes: a receiver 60, configured to receive a measurement configuration message sent by a base station, where the measurement configuration message is used to indicate a reference signal type; a processor 61, configured to perform, according to the reference signal type indicated by the measurement configuration message, signal quality measurement on a cell to obtain a measurement result; and a transmitter 62, configured to send the measurement result to the base station.

The measurement apparatus provided in this embodiment may execute the foregoing method embodiment, implementation principles and technical effects thereof are similar, and details are not described herein again.

Optionally, the measurement configuration message carries a measurement ID, where the measurement ID is used to indicate that a cell on which signal quality measurement is performed is a current serving cell or a neighboring cell of a current serving cell.

Optionally, the measurement configuration message carries a reference signal type identity, where the reference signal type identity is used to indicate the reference signal type; or measurement IDs within different value ranges are used to indicate different reference signal types.

Optionally, the reference signal type includes at least one of N reference signals, where N is a positive integer greater than 1.

Optionally, if the reference signal type is a first reference signal of the N reference signals, the processor 61 is specifically configured to measure, on the first reference signal of the cell, at least one of RSRP and RSRQ of the cell according to the first reference signal indicated by the measurement configuration message. Alternatively, if the reference signal type is a second reference signal of the N reference signals, the processor 61 is specifically configured to measure, on the second reference signal of the cell, at least one of RSRP and RSRQ of the cell according to the second reference signal indicated by the measurement configuration message. Alternatively, if the reference signal types are a first reference signal and a second reference signal, the processor 61 is specifically configured to measure, on the first reference signal of the cell, at least one of RSRP and RSRQ of the cell, and measure, on the second reference signal of the cell, at least one of the RSRP and the RSRQ of the cell, according to the first reference signal and the second reference signal indicated by the measurement configuration message.

Optionally, the first reference signal is a common reference signal CRS, and the second reference signal is a CSI-RS.

The measurement apparatus provided in this embodiment may execute the foregoing method embodiment, implementation principles and technical effects thereof are similar, and details are not described herein again.

Figure 7:
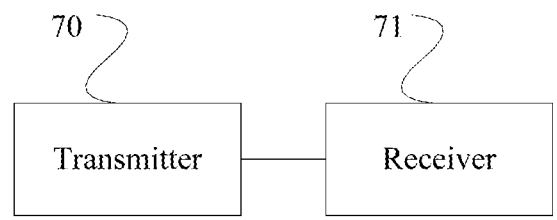
FIG. 7 is a schematic diagram of a structure of Embodiment 5 of a signal measurement apparatus according to the present invention.

FIG. 7 is a schematic diagram of a structure of Embodiment 5 of a signal measurement apparatus according to the present invention. As shown in FIG. 7, the apparatus includes: a transmitter 70, configured to send a measurement configuration message to UE, where the measurement configuration message is used to indicate a reference signal type, so that the UE performs, according to the reference signal type indicated by the measurement configuration message, signal quality measurement on a cell to obtain a measurement result; and a receiver 71, configured to receive the measurement result reported by the UE.

The measurement apparatus provided in this embodiment may execute the foregoing method embodiment, implementation principles and technical effects thereof are similar, and details are not described herein again.

Figure 8:
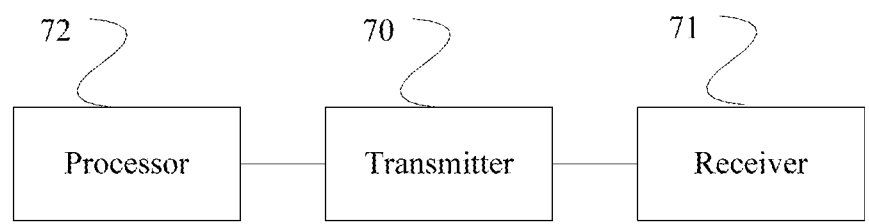
FIG. 8 is a schematic diagram of a structure of Embodiment 6 of a signal measurement apparatus according to the present invention.

FIG. 8 is a schematic diagram of a structure of Embodiment 6 of a signal measurement apparatus according to the present invention. Based on the embodiment shown in FIG. 7, the apparatus includes: a processor 72, configured to: before the transmitter sends the measurement configuration message to the UE, configure the measurement configuration message according to a carrier type of a neighboring cell of a current serving cell.

Optionally, the measurement configuration message carries a measurement identity ID, where the measurement ID is used to indicate that a cell on which signal quality measurement is performed is the current serving cell or the neighboring cell of the current serving cell.

Optionally, the measurement configuration message carries a reference signal type identity, where the reference signal type identity is used to indicate the reference signal type; or measurement IDs within different value ranges are used to indicate different reference signal types.

Optionally, the reference signal type includes at least one of N reference signals, where N is a positive integer greater than 1.

The measurement apparatus provided in this embodiment may execute the foregoing method embodiment, implementation principles and technical effects thereof are similar, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:
1. A signal measurement method comprising:
receiving, by a user equipment (UE), a measurement configuration message sent by a base station, wherein:
the measurement configuration message indicates a reference signal type; and
the reference signal type indicated by the measurement configuration message is indicated by a bit value comprising 2 bits; and
when the bit value corresponds to a first value, the bit value instructs the UE to measure, on a first reference signal of a cell corresponding to a measurement identity (ID), a reference signal received power (RSRP) or a reference signal received quality (RSRQ) of the cell according to a parameter in the measurement configuration message; or
when the bit value corresponds to a second value, the bit value instructs the UE to measure, on a second reference signal of the cell corresponding to the measurement ID, the RSRP or the RSRQ of the cell according to the parameter in the measurement configuration message; or
when the bit value corresponds to a third value, the bit value instructs the UE to measure, on the first reference signal of the cell corresponding to the measurement ID, the RSRP or the RSRQ of the cell and to measure, on the second reference signal of the cell, the RSRP or the RSRQ of the cell, according to the parameter in the measurement configuration message
performing, by the UE according to the reference signal type indicated by the measurement configuration message, signal quality measurement on the cell to obtain a measurement result;
sending, by the UE, the measurement result to the base station; and
wherein the measurement configuration message carries a measurement object indicating the cell on which the UE is to perform the signal quality measurement, the signal quality measurement is performed only on a current serving cell of the UE, only on one or more neighboring cells of the current serving cell, or on the current serving cell and the one or more neighboring cells, the measurement configuration message further carries the measurement ID indicating that the cell on which the signal quality measurement is performed is the current serving cell or a cell of the one or more neighboring cells of the current serving cell.

2. The method according to claim 1,
wherein the measurement configuration message carries a reference signal type identity, wherein the reference signal type identity indicates the reference signal type; or
wherein measurement IDs within different value ranges indicate different reference signal types.

3. A non-transitory computer-readable storage medium comprising instructions which, when executed by a computer, cause the computer to carry out the method of claim 1.

4. The method according to claim 1, wherein the reference signal type comprises at least one of N reference signals, and wherein N is a positive integer greater than 1.

5. The method according to claim 4, wherein when the reference signal type indicates a first reference signal of the N reference signals, the performing, by the UE according to the reference signal type indicated by the measurement configuration message, signal quality measurement on a cell to obtain a measurement result specifically comprises:
measuring, by the UE on the first reference signal of the cell, at least one of reference signal received power (RSRP) and reference signal received quality (RSRQ) of the cell according to the first reference signal indicated by the measurement configuration message; or
when the reference signal type indicates a second reference signal of the N reference signals, the performing, by the UE according to the reference signal type indicated by the measurement configuration message, signal quality measurement on a cell to obtain a measurement result specifically comprises:
measuring, by the UE on the second reference signal of the cell, at least one of RSRP and RSRQ of the cell according to the second reference signal indicated by the measurement configuration message; or
when the reference signal type indicates a first reference signal and a second reference signal, the performing, by the UE according to the reference signal type indicated by the measurement configuration message, signal quality measurement on a cell to obtain a measurement result specifically comprises:
measuring, by the UE on the first reference signal of the cell, at least one of RSRP and RSRQ of the cell and measuring, by the UE on the second reference signal of the cell, at least one of the RSRP and the RSRQ of the cell, according to the first reference signal and the second reference signal indicated by the measurement configuration message.

6. A signal measurement method comprising:
determining, by a base station, a threshold of a measurement identity (ID), wherein:
when the measurement ID is less than the threshold, the measurement ID indicates a first reference signal type;
when the measurement ID is equal to the threshold, the measurement ID indicates a second reference signal type; and
when the measurement ID is greater than the threshold, the measurement ID indicates the first reference signal type and the second reference signal type;
sending, by the base station, a measurement configuration message to user equipment (UE), wherein the measurement configuration message indicates a reference signal type, wherein the reference signal type is the first reference signal type or the second reference signal type, and wherein the reference signal type indicated by the measurement configuration message is used by the UE to perform signal quality measurement on a cell to obtain a measurement result;
receiving, by the base station, the measurement result reported by the UE;
configuring, by the base station, the measurement configuration message; and
wherein the measurement configuration message carries a measurement object indicating the cell on which the UE is to perform the signal quality measurement, the signal quality measurement is performed only on a current serving cell of the UE, only on one or more neighboring cells of the current serving cell, or on the current serving cell and the one or more neighboring cells, the measurement configuration message further carries the measurement ID indicating that the cell on which the signal quality measurement is performed is the current serving cell or a cell of the one or more neighboring cells of the current serving cell.

7. The method according to claim 6,
wherein the measurement configuration message carries a reference signal type identity, wherein the reference signal type identity indicates the reference signal type; or
wherein measurement IDs within different value ranges indicate different reference signal types.

8. The method according to claim 6, wherein the reference signal type comprises at least one of N reference signals, and wherein N is a positive integer greater than 1.

9. A signal measurement apparatus comprising:
a receiver, configured to receive a measurement configuration message sent by a base station, wherein the measurement configuration message indicates a reference signal type;
a processor;
a memory storing a program to be executed in the processor, the program comprising instructions for:
performing, according to the reference signal type indicated by the measurement configuration message, signal quality measurement on a cell to obtain a measurement result;
a transmitter, configured to send the measurement result to the base station;
wherein the measurement configuration message carries a measurement object indicating the cell on which to perform the signal quality measurement, the signal quality measurement is performed only on a current serving cell, only on one or more neighboring cells of the current serving cell, or on the current serving cell and the one or more neighboring cells, the measurement configuration message further carries a measurement identity (ID) indicating that the cell on which the signal quality measurement is performed is the current serving cell or a cell of the one or more neighboring cells of the current serving cell; and
wherein:
when the measurement ID is less than a threshold, the measurement ID indicates a first reference signal type;
when the measurement ID is equal to the threshold, the measurement ID indicates a second reference signal type; and
when the measurement ID is greater than the threshold, the measurement ID indicates the first reference signal type and the second reference signal type.

10. The signal measurement apparatus according to claim 9,
wherein the measurement configuration message carries a reference signal type identity, wherein the reference signal type identity indicates the reference signal type; or
wherein measurement IDs within different value ranges indicate different reference signal types.

11. The signal measurement apparatus according to claim 9, wherein the reference signal type comprises at least one of N reference signals, and wherein N is a positive integer greater than 1.

12. The signal measurement apparatus according to claim 11, wherein
when the reference signal type indicates a first reference signal of the N reference signals, the program comprises further instructions for measuring, on the first reference signal of the cell, at least one of reference signal received power (RSRP) and reference signal received quality (RSRQ) of the cell according to the first reference signal indicated by the measurement configuration message; or
when the reference signal type indicates a second reference signal of the N reference signals, the program comprises further instructions for measuring, on the second reference signal of the cell, at least one of RSRP and RSRQ of the cell according to the second reference signal indicated by the measurement configuration message; or
when the reference signal type indicates a first reference signal and a second reference signal, the program comprises further instructions for
measuring, on the first reference signal of the cell, at least one of RSRP and RSRQ of the cell, and
measuring, on the second reference signal of the cell, at least one of the RSRP and the RSRQ of the cell, according to the first reference signal and the second reference signal indicated by the measurement configuration message.

13. The signal measurement apparatus according to claim 12, wherein the first reference signal is a common reference signal (CRS), and the second reference signal is a channel state information-reference signal (CSI-RS).

14. A signal measurement apparatus comprising:
a transmitter, configured to send a measurement configuration message to user equipment (UE), wherein:
the measurement configuration message indicates a reference signal type, wherein type; and
the reference signal type indicated by the measurement configuration message is used by the UE to perform signal quality measurement on a cell to obtain a measurement result; and
the reference signal type indicated by the measurement configuration message is indicated by a bit value comprising 2 bits; and
when the bit value corresponds to a first value, the bit value instructs the UE to measure, on a first reference signal of the cell corresponding to a measurement identity (ID), a reference signal received power (RSRP) or a reference signal received quality (RSRQ) of the cell according to a parameter in the measurement configuration message; or
when the bit value corresponds to a second value, the bit value instructs the UE to measure, on a second reference signal of the cell corresponding to the measurement ID, the RSRP or the RSRQ of the cell according to the parameter in the measurement configuration message; or
when the bit value corresponds to a third value, the bit value instructs the UE to measure, on the first reference signal of the cell corresponding to the measurement ID, the RSRP or the RSRQ of the cell and to measure, on the second reference signal of the cell, the RSRP or the RSRQ of the cell, according to the parameter in the measurement configuration message;
a receiver, configured to receive the measurement result reported by the UE; and
a processor, configured to configure the measurement configuration message, wherein the measurement configuration message carries a measurement object indicating the cell on which the UE is to perform the signal quality measurement, the signal quality measurement is performed only on a current serving cell of the UE, only on one or more neighboring cells, or on the current serving cell and the one or more neighboring cells, the measurement configuration message further carries the measurement ID indicating that the cell on which the signal quality measurement is performed is the current serving cell or a cell of the one or more neighboring cells of the current serving cell.

15. The signal measurement apparatus according to claim 14, wherein the measurement configuration message carries a reference signal type identity, wherein the reference signal type identity indicates the reference signal type; or measurement IDs within different value ranges indicate different reference signal types.

16. The signal measurement apparatus according to claim 14, wherein the reference signal type comprises at least one of N reference signals, wherein N is a positive integer greater than 1.

* * * * *

UNITED STATES PATENT AND TRADEMARK OFFICE
CERTIFICATE OF CORRECTION

PATENT NO. : 10,805,814 B2
APPLICATION NO. : 15/048386
DATED : October 13, 2020
INVENTOR(S) : Xingwei Zhang et al.

Page 1 of 1

It is certified that error appears in the above-identified patent and that said Letters Patent is hereby corrected as shown below:

In the Claims

In Column 19, Line 40, Claim 14, delete "type, wherein".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*